US006997805B2

(12) United States Patent
Vancura

(10) Patent No.: US 6,997,805 B2
(45) Date of Patent: Feb. 14, 2006

(54) MULTI-REEL, MULTI-LINE BONUS GAME FOR A CASINO BASE GAME HAVING GAME FEATURES AND METHOD THEREFOR

(75) Inventor: Olaf Vancura, Las Vegas, NV (US)

(73) Assignee: Mikohn Gaming Corporation, Las Vegas, NV (US)

( * ) Notice: Subject to any disclaimer, the term of this patent is extended or adjusted under 35 U.S.C. 154(b) by 0 days.

(21) Appl. No.: 10/922,195

(22) Filed: Aug. 19, 2004

(65) Prior Publication Data

US 2005/0059476 A1 Mar. 17, 2005

Related U.S. Application Data

(60) Provisional application No. 60/503,085, filed on Sep. 15, 2003.

(51) Int. Cl.
*A63F 9/24* (2006.01)
*A63F 13/00* (2006.01)
*A63B 71/06* (2006.01)

(52) U.S. Cl. ....................... 463/20; 463/25; 273/148 R

(58) Field of Classification Search .............. 463/9–13, 463/16–20, 25, 40–43; 273/143 R, 139, 273/292–293; 700/91–93; 340/323 R
See application file for complete search history.

(56) References Cited

U.S. PATENT DOCUMENTS 6,033,307 A 3/2000 Vancura
6,047,963 A 4/2000 Pierce et al.
6,110,043 A 8/2000 Olsen
6,146,273 A 11/2000 Olsen
6,173,955 B1 1/2001 Perrie et al.
6,190,255 B1 2/2001 Thomas et al.
6,203,429 B1 3/2001 Demar et al.
6,217,448 B1 4/2001 Olsen
6,311,976 B1 11/2001 Yoseloff et al.
6,398,644 B1 6/2002 Perrie et al.
6,409,172 B1 6/2002 Vancura (Continued)

FOREIGN PATENT DOCUMENTS

GB 2 262 642 A 6/1993

(Continued)

OTHER PUBLICATIONS

IGT. The Great Turkey Shoot Video Slots [online], [retrieved on Sep. 30, 2004]. Retrieved from the Internet <URL: http://www.igt.com/gaminggroup/games/game.asp?pid=5.12.108&theme_id+2468>.

(Continued)

*Primary Examiner*—Mark Sager
(74) *Attorney, Agent, or Firm*—Dorr, Carson & Birney, PC

(57) ABSTRACT

A method for operating two different bonus games in a casino game machine. The first bonus game is played when a first predetermined orientation of the bonus symbols occurs on a pay line. The bonus game has a meter and a path to a goal wherein the path has a number of stopping points. The player advances based on player input from stopping point to stopping point along the path to the goal until either the meter reaches a predetermined value that ends the bonus game or until the goal is reached. The second bonus game is played when a second predetermined orientation of the bonus symbols occurs. The operation of the casino game is further affected by providing a graphic image in the video display of the reels to affect the play outcome. A game ticket version is also shown.

21 Claims, 17 Drawing Sheets

U.S. PATENT DOCUMENTS

| | | | |
|---|---|---|---|
| 6,413,160 | B1 | 7/2002 | Vancura |
| 6,501,899 | B1 | 12/2002 | Marrs et al. |
| 6,609,791 | B1 | 8/2003 | Miyamoto et al. |
| 6,609,971 | B1 | 8/2003 | Vancura |
| 6,666,765 | B1 | 12/2003 | Vancura |
| 6,726,562 | B1 | 4/2004 | Vancura |
| 6,769,986 | B1 | 8/2004 | Vancura |
| 6,852,028 | B1 | 2/2005 | Vancura |
| 2003/0153375 | A1 | 8/2003 | Vancura |
| 2003/0176210 | A1 | 9/2003 | Vancura |

FOREIGN PATENT DOCUMENTS

| | | |
|---|---|---|
| WO | WO 97/32285 | 9/1997 |

OTHER PUBLICATIONS

Grochowski. More New Games from IGT [online], [retrieved on Sep. 09, 2004]. Retrieved from the Internet <URL: http:/grpchowski.casinocitytimes.com/articles/5893.html>.

| Step | 1st Possibility | 2nd Possibility |
|---|---|---|
| Step 1 | Tile a<br>Cymbals (-2Z sleep) | Tile b<br>One of 15x, 25x, 35x |
| Step 2 | Tile c<br>Party Horn (-1Z sleep) | Tile d<br>One of 25x, 35x, 45x |
| Step 3 | Tile e<br>Dog (-2Z sleep) | Tile f<br>Harp (+ 1Z sleep) |
| Step 4 | Tile g<br>Car horn (-2Z sleep) | Tile h<br>One of 25x, 35x, 45x |

*Fig. 3B*

Choose Your Victim Paytable

| C | Character |
|---|---|
| O | One of 60x, 80x, 100x |
| J | One of 45x, 50x, 60x |
| A | One of 25x, 30x, 35x |

*Fig. 6*

Target Practice Paytable

| P Probability | Hit (+ Spin) | Miss |
|---|---|---|
| 0.2 | 50x | 40x |
| 0.2 | 60x | 45x |
| 0.2 | 75x | 50x |
| 0.2 | 80x | 60x |
| 0.2 | 100x | 80x |

*Fig. 7*

| P | Award |
|---|---|
| 0.2 | 2x |
| 0.2 | 3x |
| 0.4 | 5x |
| 0.2 | 10x |
| Ave | 5x |

Fig. 10

| P | Award |
|---|---|
| 0.2 | 3x |
| 0.2 | 4x |
| 0.2 | 5x |
| 0.2 | 6x |
| 0.2 | 7x |
| Ave | 5x |

Fig. 12

| STEP | TILE | TILE |
|---|---|---|
| 1 | a<br>-Z | b<br>Next Step |
| 2 | c<br>-2 Z | d<br>Next Step |
| 3 | e<br>Next Step | f<br>-1 Z |
| 4 | g<br>-1 Z | h<br>Open Door |

| STEP | TILE | TILE |
|---|---|---|
| 1 | a<br>-1 Z | b<br>-2 Z |
| 2 | c<br>-1 Z | d<br>Next Step |
| 3 | e<br>-3 Z | f<br>-3 Z |
| 4 | g<br>Lose | h<br>Lose |

MULTI-REEL, MULTI-LINE BONUS GAME FOR A CASINO BASE GAME HAVING GAME FEATURES AND METHOD THEREFOR

RELATED APPLICATIONS

This application claims priority to U.S. Provisional Patent Application Ser. No. 60/503,085 filed Sep. 15, 2003 entitled "Multi-Reel, Multi-Line Bonus Game for a Casino Base Game Having Game Features and Method Therefor."

BACKGROUND OF THE INVENTION

1. Field of the Invention

This invention relates to a multi-reel, multi-line casino game machine and, in particular, to a base game having a casino bonus game and to a casino base game having game features.

2. Background

Casino game machines having an underlying casino base game with an accompanying bonus game are well known in the casino industry. Likewise, placing the bonus game in a top box usually physically above the casino base game so that passersby can view top box bonus play game are well known. Such bonus games are activated randomly during play of the casino base game in the casino game machine by issuing a bonus condition. The bonus condition could be triggered when a bonus symbol appears in the play outcome of the casino base game such as a bonus symbol on a reel on a pay line in a slot casino base game. Or the bonus game can be triggered by another random event such as random coin in when the player places the wager.

A continuing need exists in the casino gaming industry to provide new, novel, and exciting games to the playing public. A need exists in the casino gaming industry to incorporate graphic themes and video sequences actually in the play of the casino base game and in the play of the bonus game. A need further exists in the casino gaming industry to have more than one type of bonus game for a player in the play of the casino base game.

The hardware necessary to implement new bonusing methods is well known and is based in a computer operating system within a casino base game that is responsive to wagers placed, payouts made, and various inputs from the player. These hardware configurations in such computer operating systems are commonly termed gaming platforms, and gaming platforms vary among the various casino game machine manufacturers. Implementing into such gaming machine platforms via software with respect to game play, random bonus conditions, graphical presentations and actual video sequences is conventional. A need exists to implement on such conventional casino game machine platforms, novel new methods for players to enjoy play not only in the play of the casino base game with exciting new base game features but also any accompanying bonus games.

SUMMARY OF THE INVENTION

The present invention meets the aforesaid needs.

In the first aspect, a novel method for operating two bonus games in a casino game machine having a multi-reel, multi-pay line casino base game is presented. A set of bonus symbols provided in the casino game randomly occurs. A first bonus game is played when a first predetermined orientation of the bonus symbols, such as left to right on the reels, occurs on one or more wagered pay lines during the play outcome of the casino base game. A second bonus game is played when a second predetermined orientation of the bonus symbols such as appearing on the reels right to left, occurs during play outcome of the casino base game. Suitable awards are made for play outcome of the first and second bonus games.

In another aspect of the present invention, a bonus game is operated in a casino game machine having a casino base game. The bonus game is played when a bonus condition occurs in the play of the casino base game. The bonus game has a meter and a path to a goal wherein the path has a number of stopping points. At each stopping point, the player is provided a choice of inputs. The meter is adjusted when the player inputs a choice that changes a value in the meter. The player is allowed to advance from stopping point to stopping point along the path to the goal until either the meter reaches a predetermined value that ends the bonus game or until the goal is reached.

In another aspect of the present invention, a method for operating a bonus game in a casino game machine having a casino base game is set forth. The bonus game is played when a bonus condition occurs in the play of the casino base game. The player is provided an input choice of displayed characters at the start of the bonus game. In response to inputting a character choice, the player plays the bonus game. If the player is correct in the bonus play, then the displayed chosen character is affected to allow the player to play another bonus game (or, in another embodiment, to award the player). When the player is incorrect in the bonus play, the bonus game ends.

Another aspect of the present invention is the operation of a casino game having a predetermined number of reels affected by providing a graphic image in the video display of the reels. An award feature is randomly activated for the casino game. Hence, when the casino game is played in the video display, the reels are spun to achieve a game outcome for at least one wagered pay line. The graphic image when the award feature is randomly activated affects the spinning of a set number of the reels and visually causes the affected set number to then spin to the game outcome. For example, the set number of reels can continue to spin after the other reels have stopped for the game outcome. The animated graphic image can then take a fist and pound each one of the set number of reels so that they stop for the final game outcome.

In another aspect of the present invention, a method for operating a casino game having a predetermined number of reels with symbols is set forth wherein a graphic image is provided in the video display distinct from the reels. The casino game is played in the video display and the reels are spun to a game outcome for at least one wagered pay line. The graphic image is then randomly animated to interact with at least one of the symbols in the game outcome and the player is suitably awarded. In one embodiment, the interaction is to cause the at least one symbol to become wild thereby increasing a player's chance to be awarded.

In another aspect of the present invention, a game ticket is set forth incorporating the above novel bonus games and game features.

BRIEF DESCRIPTION OF THE DRAWINGS

FIG. 3B sets forth the probability table for the four character steps as illustrated in FIG. 3A.

FIG. 6 sets forth the Choose Your Victim Paytable.

FIG. 7 sets forth the Target Practice Paytable based on a hit or a miss for the illustration of FIG. 5.

FIG. 10 sets forth a pay table for the game feature of FIG. 9.

FIG. 12 sets forth the pay table for the game feature of FIG. 11.

DETAILED DESCRIPTION OF THE INVENTION

1. Overview

Three separate bonus games and three separate play features for a casino base game 20 are disclosed herein. For the bonus games, the arrangement is such that a bonus game occurs when bonus triggers appear in the casino base game outcome plays, either a first bonus game based on bonus triggers appearing on a wagered pay line in a left (L) to right (R) reel orientation or a second bonus game based on bonus triggers appearing on a wagered pay line in a right (R) to left (L) reel orientation. Successfully completing either of these bonus games by the player launches the third bonus game, which is, in one embodiment, a top box feature. During play of the casino base game three different game features are randomly initiated to add further play excitement.

Figure 1:
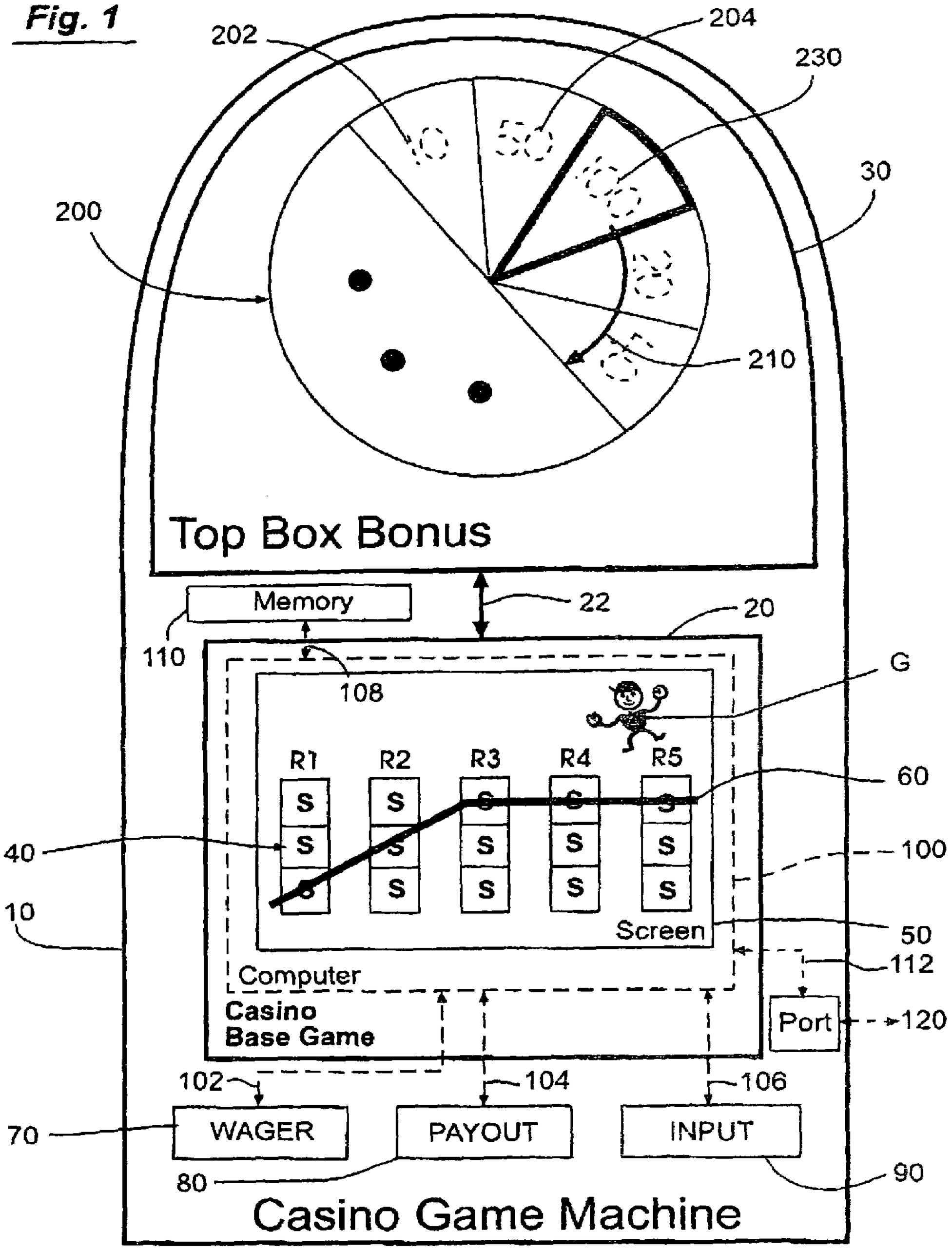
FIG. 1 sets forth the general details of a casino game machine incorporating the bonus games and the game features of the present invention.

In FIG. 1, a casino game machine 10 is shown to have a casino base game component 20 and a top box bonus game component 30. The provision of a top box bonus game 30 and connection 22 to the casino base game 20 is conventional. The top box game in FIG. 1 has a bonus wheel 200 with a plurality of segments 202. Each segment has an award value 204. A rotating segment is lit 230 and moves in the direction of arrow 210 until landing on a single segment with a single award value for the top box bonus award to the player. The many conventional details for operating a casino game machine 10 are not shown in FIG. 1 as it is well understood in the industry how to receive wagers, deliver payoffs, operate a casino game machine, etc. In FIG. 1, a conventional wager input device(s) 70 is shown and comprises any form of inputting wagers into a casino game machine 10. Likewise a conventional payout device(s) 80 is shown and, again, any suitable payout device or devices can be utilized. Also shown is a conventional player input device 90 that allows the player to select which pay lines to play in the casino based game. Input 90 would include any other input (such as max bet, spin the reels, etc.).

In FIG. 1, a computer 100 is shown interconnected 102 to the wager input device 70, interconnected 104 to the payout 80, interconnected 106 to the player input 90, interconnected 108 to a memory 110, and interconnected 112 to a communications port 120. The computer 100 controls the casino game machine 10, the casino base game 20, and the top box bonus game 30. The computer 100 can be any type of processor suitably adapted for the casino game machine as conventionally done in the gaming industry. The computer 100 is connected to a touch screen 50 and operates the bonus wheel 200 as well as the various bonus games and game play features discussed herein. The various methods of bonus game play and feature base game play presented herein are suitably programmed into the memory 110 so that the computer 100 can implement the teachings contained herein.

For purposes of the present invention, in one embodiment, the casino base game 20 is a multi-reel, multi-line video presentation 40 on a conventional touch screen 50. Many conventional products of such multi-reel, multi-line casino games are known. For example, in FIG. 1, five reels R1, R2, R3, R4, R5 are shown and fifteen pay lines 60 are provided wherein the player can wager 70 on each pay line 60 individually, selected pay lines, or all pay lines (based on an input to input 90).

For example, in FIG. 1, a pay line 60 is shown in the matrix of fifteen symbols S (three displayed symbols S per reel R times five reels). In the following disclosure, the invention is illustrated with this five-reel 40, fifteen-pay line 60 configuration. It is to be expressly understood that any number of reels R and any number of pay lines 60 could be utilized to implement the teachings of the present invention as presented herein. The fifteen pay lines 60 are unique for the first three reels Left to Right (i.e., R1, R2, and R3), but not unique for the last three reels Right to Left (i.e., R5, R4, and R3). That is, on the first three reels R1, R2, and R3 each pay line 60 is unique. On the last three reels R3, R4, and R5 sometimes (e.g., diagonal arrangement) the same symbol arrangement will be on multiple lines. Hence, as will be explained later, the player may qualify for more than one bonus game on the same spin. Should the player do so (e.g., with five bonus triggers on the active pay line, with three bonus triggers R to L on more than one pay line), the bonus games, in one embodiment, are played in succession. Playing successive bonus games provides substantial excitement to the player. In other embodiments, the bonus games can be played as one (with awards suitably adjusted to reflect the sum, etc.). In these embodiments the award adjustment could, for example, be 2X, 3X, etc. for achieving two bonus games, three bonus games, etc. Or, the award adjustment could be, for example, that the second and subsequent bonus games provide higher payoffs based on a pay table on the machine 10.

In FIG. 1, an image G is shown on the touch screen 50 near the video representation of the reels 40. The purpose of image G is to implement a number of game features for play of the casino base game 20 and will be discussed subsequently. It is to be expressly understood that any number of reels R1–R5 could be utilized and that any number of pay lines 60 could also be utilized without limiting the teachings of the present invention. Furthermore, in another embodiment, the top box bonus game 30 can be incorporated into the same screen 50 so as to eliminate the additional structure associated with a top box (i.e., a physical display on top of the casino base game). In addition, any number of bonus games can be utilized under the teachings of the present invention. The triggering bonus symbols for the bonus games can be oriented, as discussed above, or in any other fashion on the matrix of reels R1–R5 and the symbols S. For example, the first bonus game can be activated with other triggering configurations in the matrix of symbols S and reels R1-R5. The number of game features based on the graphic G can be any number and what the graphic G is can be any suitable graphic such as, but not limited to, a character.

2. Method of Operation for the Bonus Games of the Present Invention

Figure 2A:
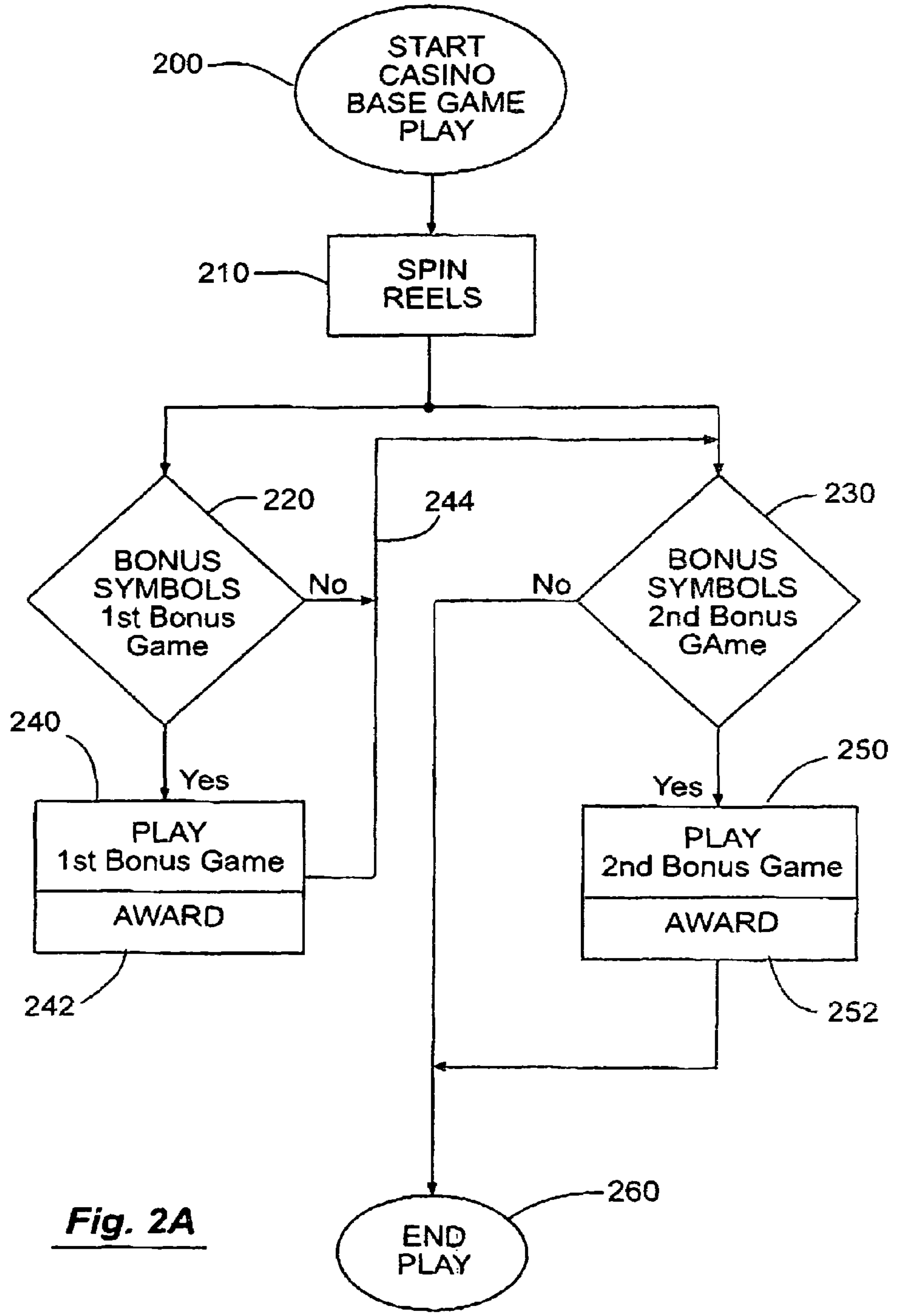
FIG. 2A sets forth a flow chart for playing a first bonus game and a second bonus game based on the orientation of bonus symbols on pay lines of the casino game machine of FIG. 1.
Figure 2B:
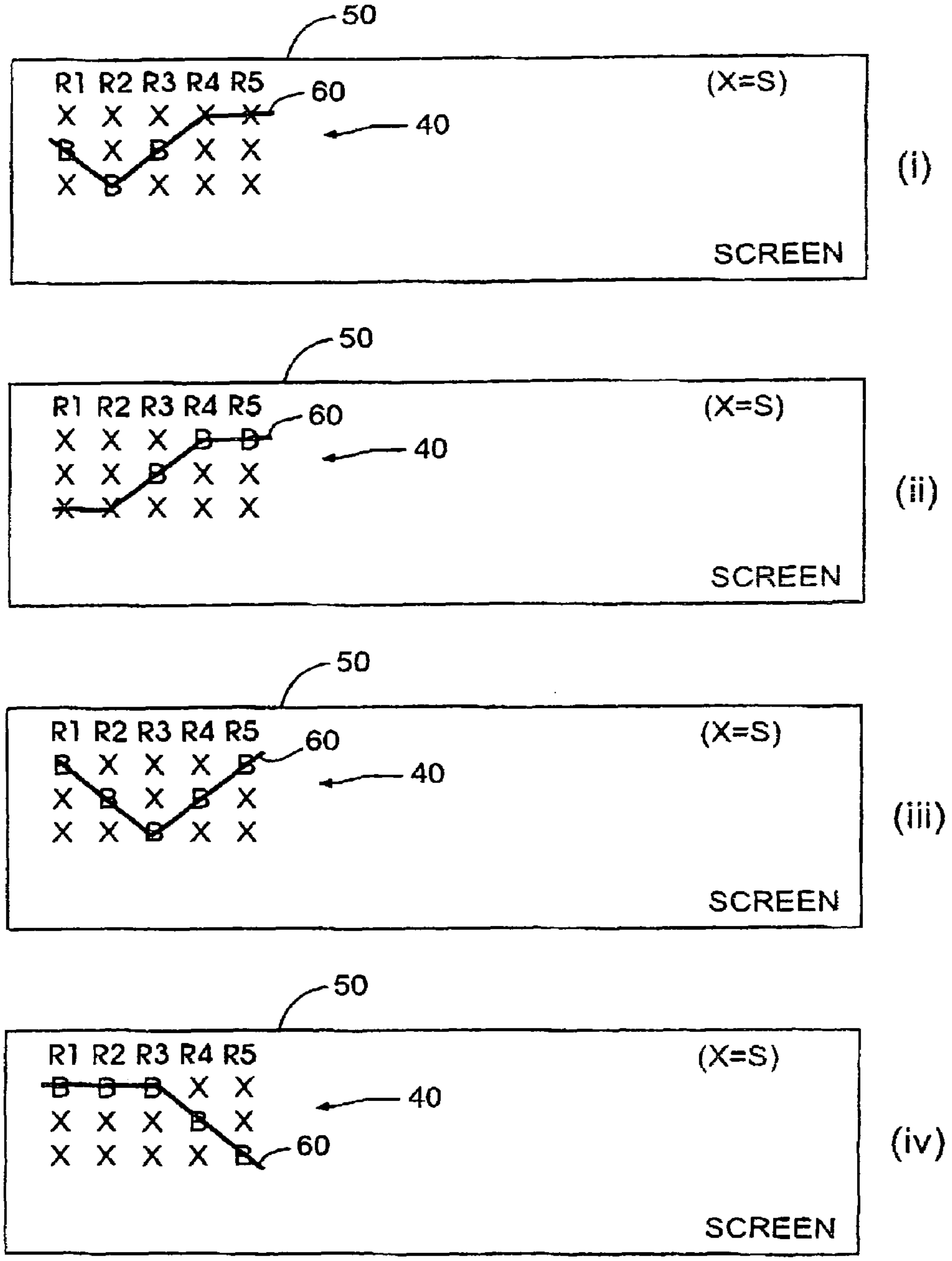
FIG. 2B illustrates four predetermined bonusing orientations or patterns.

Under the teachings of the present invention and as shown in FIG. 2B, the same symbol B (or set of symbols, e.g. {B1, B2, B3, B4, B5}, for a five-reel game) can trigger at least two different bonus games based on the game outcome of the same symbol B (or set of symbols) on a pay line 60 for the casino base game 60 (e.g., on reels L to R and R to L).

In FIG. 2A, the method of the present invention is set forth as programmed into the software of the computer 100 control for the casino game machine 10. The casino base game 20 is started 200 by placing a wager into the wager input device 70 (or conventionally making a wager based on existing credits) and selecting pay lines through the input 90. This starts 200 conventional play of the casino base game 20 by spinning 210 the reels 40. The computer 100 control for the casino base game machine 10, based on the outcome for the base game play 200 in spinning 210 the reels 40 (through use of a conventional random number table and/or conventional software), reaches a desired game outcome and the player is awarded based on winning combinations on all wagered pay lines. It is to be expressly understood that the player may wager on all existing pay lines as discussed above in conventional casino base games. Many different multi-reel, multi-line casino base games 20 conventionally exist, and the present invention, in its various embodiments, set forth herein can be implemented into these existing or future casino base games.

Under the teachings of the present invention, the reels 40 are provided with at least one bonus symbol B on each reel (in FIG. 1, reels R1, R2, R3, R4, and R5) of the reels 40 in the multi-reel, multi-line casino base game 20. The bonus symbol B, in one embodiment, is identical on each of the reels. The computer 100 controlling the casino game machine 10 allows the player to play a first bonus game when a first predetermined orientation of bonus symbols B appears on a wagered pay line in a game outcome as shown by step 220 in FIG. 2A. Likewise, the player plays a second bonus game under computer 100 control when a second predetermined orientation of bonus symbols B appears on a wagered pay line in a game outcome as shown by step 230.

As discussed above, the first bonus game play 220 occurs when three bonus trigger symbols B align Left to Right on the first three reels (R1, R2, and R3) of the reels 40. This is the first predetermined orientation (i.e., three bonus trigger symbols located Left to Right on reels R1, R2, and R3). The second predetermined orientation occurs in the above example with three bonus trigger symbols B aligned Right to Left on reels R5, R4, and R3. While these are two predetermined orientations for aligning bonus trigger symbols B on wagered pay lines in a multi-reel, multi-line base game 20, it is to be expressly understood that any suitable predetermined orientation of bonus trigger symbols B could be utilized with the teachings of the present invention with more or less than five reels and with more or less than fifteen pay lines.

The computer 100 control for the casino game machine 10 allows the player to play the first 220 and second 230 bonus games under its control. This occurs in steps 240 and 250. The play of each bonus game 220, 230 in steps 240 and 250 includes any awards 242, 252 (as subsequently discussed) to the player. In FIG. 2A when no bonus symbols align for the first bonus game in stage 220, stage 230 is entered. When no bonus symbols align for the second bonus game, play ends 260.

As mentioned above, the bonus games 220, 230, in the embodiment of FIG. 2A, are played in succession under control of the casino game machine 10. After play of the bonus games 240 and 250, the base game play ends 260. In an alternate embodiment, the at least one bonus trigger symbol B may be different in appearance on each reel, e.g., B1, B2, B3, B4, B5. Nevertheless, the same set of symbols is used, based on orientation (L to R or R to L) to initiate the two different bonus games.

In FIG. 2B, four examples of bonus game qualification are shown. In FIG. 2B(i), a set of three bonus trigger symbols B align Left to Right on reels R1, R2, and R3 on the screen 50. The other symbols shown as "X" can be any other symbol S on the reels 40. The alignment of bonus trigger symbols B occurs on a pay line 60 which, for example, could be pay line 9 in the reels 40. The alignment (step 220 in FIG. 2A) of bonus trigger symbols B in FIG. 2B(i) qualifies the player to play 240 the first bonus game.

In FIG. 2B(ii), a set of three bonus trigger symbols B aligns on a pay line 60 (for example, pay line 7) from Right to Left on reels R5, R4, and R3, thereby qualifying the player to play 250 the second bonus game.

In FIG. 2B(iii), bonus trigger symbols B align on a pay line 60 (for example, pay line 4), which qualifies the player for both bonus games: one with three bonus trigger symbols B Left to Right for play 240 of the first bonus game and one with three bonus triggers Right to Left for play 250 of the second bonus game. The player would then play the two bonus games successively as shown in FIG. 2A by line 244.

Any suitable combination or pattern of predetermined bonus trigger symbols B can be used. Other examples are three bonus trigger symbols B (L to R) for the first bonus game and five trigger symbols B (R to L) for the second bonus game. And, the alignment can occur on the same or different pay lines.

Finally, in FIG. 2B(iv), the player would also qualify for the first and second bonus games in steps 220 and 230. In summary, the same symbol, based on its predetermined orientation on a wagered pay line 60 on the reels 40 after a spin to a game outcome, can launch two different bonus games. The L to R and R to L orientations disclosed herein are then but one example of many possible patterns (i.e., any of a number of different predetermined orientations).

In summary, what has been discussed above is the method of operating at least two bonus games in a casino game machine 10 having a multi-reel, multi-pay line casino base game 20. The method provides at least one bonus trigger symbol B on each reel 40 of the multi-reel casino base game 20 wherein each of at least one bonus trigger symbol B is from the same set of bonus triggering symbols B on each reel 40. A first bonus game is played when a first predetermined orientation of a set of bonus trigger symbols B appears on a wagered pay line 60. A second bonus game is played when a second predetermined orientation of a set of bonus trigger symbols B appears on a wagered pay line 60. The playing of the first and second bonus games occurs under control of the casino game machine 10, and awards are made based on the play outcome for the first and second bonus games.

Figure 3A:
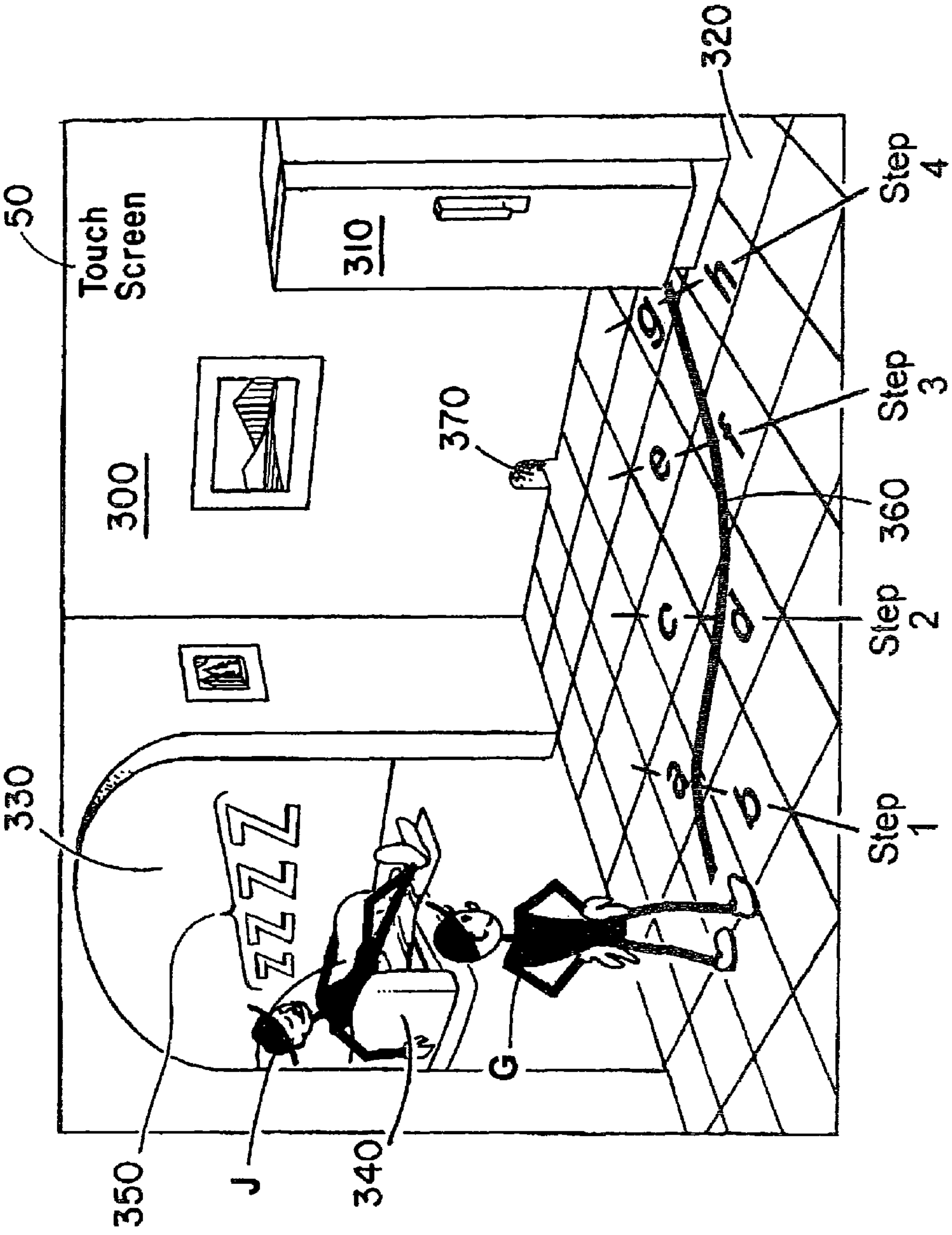
FIG. 3A sets forth an illustration of the first bonus game of the present invention.

3. First Bonus Game Description:

Upon aligning a set of bonus trigger symbols B Left to Right on the first three reels R1, R2, and R3 in step 220, the player starts play 240 by entering the bonus screen 50 for the first bonus game as shown in FIG. 3A. FIG. 3A is for purposes of illustration only, and it is to be expressly understood that any theme, graphical depiction thereof, etc., could be utilized under the teachings of the present invention. For this illustration, the theme is a kitchen 300 having a refrigerator 310, a tile floor 320, a living room 330, a sofa 340, a character J asleep in the sofa 340, and a character G in the kitchen 300.

The object of the first bonus game is to get G to the goal, which is the refrigerator 310, without waking J by following a path 360. The path 360 requires four stopping points, which in this example are "steps," and at each "step" the player selects one of two possible input choices or in this example tiles on the tile floor 320 to step on. Behind some tiles are awards; behind other tiles are gimmicks with sounds that conspire to wake (e.g., trumpet, party horn, gong) and/or soothe (e.g., violin, sunshine) the person J. A "Z meter" or sleep meter 350 is adjacent to J and begins at a start value of 4 Z's. When the sleep meter 350 reaches a predetermined value such as zero (due to "sounds that wake" such as noise, etc.), J awakens and spies G moving toward the refrigerator 310, thus ending the first bonus game.

The player is, in one embodiment, given an entry bonus award, such as, 30× line bet. In other embodiments, no entry bonus award is given. On the screen 50, the player is prompted to input one of two choices (i.e., tiles) on the floor 320 along the path 360 to the goal 310, such as by touching the screen 50 at the selected tile. G then advances to the selected tile in response to the player touching the tile.

In FIG. 3A, the path 360 that G is to take to the refrigerator 310 is illustrated. The four steps for G to take to the refrigerator 310 are labeled Step 1 through Step 4. At each step, the player chooses between two tiles for G to step on. These tiles may be optionally lit to make it more visually obvious to the player which choices on the touch screen 50 are to be selected. When each tile, as selected by the player, is touched, a result occurs as shown in FIG. 3B. This result may positively or negatively affect the travel of character G along the path 360 to the goal 310 as discussed in the following.

For example, at the first step, the player chooses either tile a or tile b for G to step on. In this example, assume the player selects tile a and touches that tile on the touch screen 50 as a player input. G then proceeds, as a graphic video sequence, to step on tile a under control of the computer 100. Unfortunately for the player, when G steps on tile a, a mouse comes out of a mouse hole 370 clashing cymbals, which causes two Z's to come off the Z meter 350 (i.e., decreases the value of the meter 350 to a value of two remaining Z's) and causes the asleep person J to stir as part of the graphic video sequence. Imparting any act to character J is optional under the teachings of the present invention.

The player now guides G to step 2 and the player touches either illuminated tile c or tile d of path 360 on the touch screen 50. Assume tile d is touched. G moves to tile d in step 2 and wins an award such as 25× (25 times the pay line wager).

The player must now choose which illuminated tile e or f for G to step on during step 3. Assume the player picks tile f. G then steps on tile f and a harp appears in the living room 330 to cause J to start sleeping and the player receives one Z to add to the Z meter 350 so that the Z meter 350 now has a value of three Z's. This places J in more of a sleep state.

One step, step 4, remains on the path 360 and tiles g and h are illuminated. This time the player selects tile g and touches tile g on the screen 50. G now moves to tile g. Here, the player receives a bonus award such as 45 times the pay line wager and the door of the refrigerator 310 opens and G enters the refrigerator 310. The player has successfully completed the path 360 to the goal 310 without waking J and has received various awards along path 360. The player is now entitled to play the top box bonus game 30.

The illustrations shown in FIGS. 3A and 3B serve to teach the principles of the present invention. It is to be expressly understood that at each step along the path 360, more or less than two input choices could be presented to the player, more or less than four steps (stopping points) could be implemented, and indeed more than one path 360 with input choices could be presented. Each step presents a choice for the player to input via a suitable input means such as touching a touch screen 50, and each choice at each step has an affect in the bonus game such as providing an award, incrementing or decrementing a meter 350, producing sounds, producing multimedia effects, ending the bonus game, etc.

The possibilities for each step for the example in FIG. 3A are set forth in FIG. 3B and in each case are drawn equally from a random pool for the three bonus triggers. These possibilities are assigned to each step on a conventional random basis by software in the computer 100. The assignment typically occurs when the first bonus game is entered in step 220 so that when FIG. 3A is displayed, the random possibilities for each step are known to software in the computer 100 in the casino game machine 10. For example, and with reference back to FIG. 3A, when the player chooses between tile a and tile b in step 1, FIG. 3B shows the possibilities that are assigned to that step. With respect to the above example, the player selects tile a in step 1 and the mouse comes out clashing cymbals, which takes away two Z's (i.e., −2Z's) in the Z meter 350. Had the player picked the other tile b in step 1, the player would have been randomly awarded either 15× or 25× or 35×. Again these choices are preferably randomly selected and assigned before play (although hidden from the player). The awards shown in FIG. 3B are for three bonus trigger symbols B appearing L to R on a pay line 60. The awards, in one embodiment, are increased when four or five bonus trigger symbols B appear on a pay line 60. For example, if four bonus trigger symbols B appear (L to R) on a pay line 60, the values in FIG. 3B are increased by 5×.

To continue with this example, in step 2 the player has a choice between tiles c and d. In the example above, the player selected tile d, which has been randomly assigned an award of 25× which is then revealed to the player. Had the player selected tile c, a clown would have appeared in a graphic video sequence squeezing a party horn causing one Z to be removed in the Z meter 350. To continue with the above example, the player now has a choice between tiles e and f in step 3, and in our example the player selected tile f, which is assigned the second possibility to add one Z. The mouse would come out of the hole 370, as an illustration, playing a harp and one Z would be added to the Z meter 350.

Figure 4:
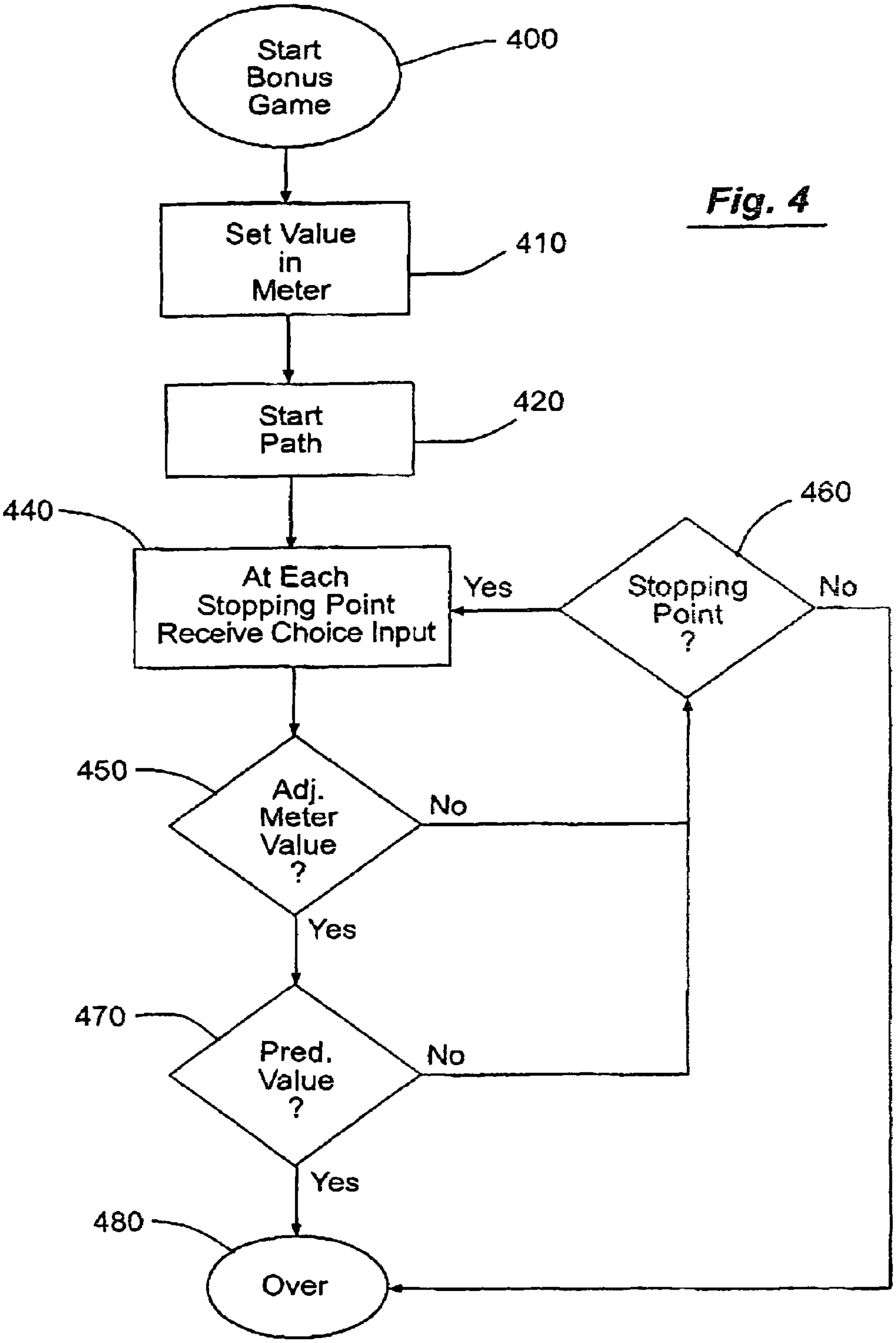
FIG. 4 sets forth the method steps for playing the first bonus game as set forth in FIGS. 3A and 3B.

In FIG. 4 the invention set forth above is implemented as a method in the casino game machine 10 of FIG. 1. Play of the bonus game starts 400 when a bonus condition occurs in the casino base game 20. The method is not limited to a multi-reel, multi-pay line casino base game 20 and any suitable casino base game 20 could be utilized having a condition that activates a bonus game. There are a number of such conditions conventionally available, and the present invention is not limited to aligned bonus trigger symbols on a pay line. The bonus game as set forth above and shown in FIGS. 3A and 3B starts with a value set in the Z meter 350 in stage 410. The player starts along a path 360 in stage 420 toward a goal 310. It is to be understood that method steps 410 and 420 could occur one before the other or simultaneously under control of the computer 100 in the casino game machine 10. The path 360, as discussed above, has a number of stopping points (i.e., step 1, step 2, etc.). The player provides a choice input (i.e., tile a or tile b, etc.) at each stopping point as shown in stage 440. With reference to FIG. 3B, the choice input from the player may result in adjustment to the Z meter 350. In stage 450 the adjustment to the Z meter 350 is determined. If no adjustment to the Z meter 350 occurs, then stage 460 is entered to determine whether or not any stopping points (i.e., steps) still remain. If stopping points still remain, then stage 440 is re-entered. If there are no further decision points, then the first bonus game is over in stage 480. That is, the path 360 is completed and the goal 310 is reached. If in stage 450, the Z meter 350 is to be adjusted, then stage 470 is entered. The resultant value in the Z meter 350 is determined in stage 470, and if it has reached a predetermined value (such as 0 in the example above of all Z's taken away), then stage 480 is reached and the first bonus game is over even though the path 360 is not completed. However, if in stage 470 the predetermined value has not been reached, then stage 460 is entered to see whether the remaining stopping points are left. The method in FIG. 4 is independent of the awards. Rather, the method in FIG. 4 concentrates on incrementing or decrementing (i.e., adjusting) the Z meter 350.

As previously mentioned, the computer 100 in the casino game machine 10 randomly selects the input possibilities (e.g., tile a or tile b, etc.) for each of a predetermined number of stopping points. The process of random selection from, for example, the table of the present invention shown in FIG. 3B, is, as mentioned, conventional and well known in the gaming industry.

A method for operating a bonus game in a casino game machine 10 has been set forth above and can be summarized as follows. A bonus game is played when a bonus condition occurs in play of the casino base game 20. The bonus game is provided with a meter 350 and a path 360 to a goal 310. The path 360 has a number of stopping points. As the player advances along the path 360, the player provides an input choice at each stopping point. The meter 350 is adjusted when the player inputs a choice that changes a value in the meter 350. The player is allowed to advance along the path 360 from stopping point to stopping point toward the goal 310 until either the meter 350 reaches a predetermined value that ends the game or the goal is reached.

It is to be expressly understood that the illustrations in FIGS. 3A and 3B serve to provide an example of how a bonus game operates under the teachings of the first bonus game of the present invention presented herein. The present invention is not limited to this example as many different specific examples can be implemented by creative graphic artists and game designers under the teachings contained herein to provide exciting bonus games to the playing public. Furthermore, while the embodiment set forth above of the present invention pertains to a bonus game, it is to be expressly understood that the bonus game described above could, in and of itself, constitute a wagering game and be independent of any underlying casino base game 20. Furthermore, it is to be expressly understood that this type of game could be implemented into a pull tab or scratch lottery-type of wagering ticket wherein each stopping point would be a scratch off area (in the case of a scratch lottery ticket). In this embodiment of the present invention, as the character G moves toward the refrigerator with the player scratching off to reveal what is underneath the tile, only Z's can be removed from the Z meter 350. Hence, a player by scratching off tiles could accumulate awards to the refrigerator 310 (goal) but, if along the way, the player loses Z's to reduce the number of Z's to zero, then the scratch lottery ticket would have no value. In other words, only upon completion of the path to the goal 310 would the player of the scratch lottery ticket receive the accumulated values (or in another embodiment the value behind the goal 310 to scratching off the refrigerator door). Hence, two embodiments exist for a scratch off lottery ticket version of the present invention. Either the player can scratch off values hidden below the tiles and obtain the accumulated values upon successfully reaching the goal 310 without bringing the meter 350 down to the predetermined value of zero or the player can successfully traverse the path 360 without reducing the meter 350 down to zero and then accumulate the value scratched off at the goal 310.

4. Second Bonus Game Description:

The second bonus game is, in one embodiment, a trivia feature comprising questions about a topic such as pets and animals.

Figure 5:
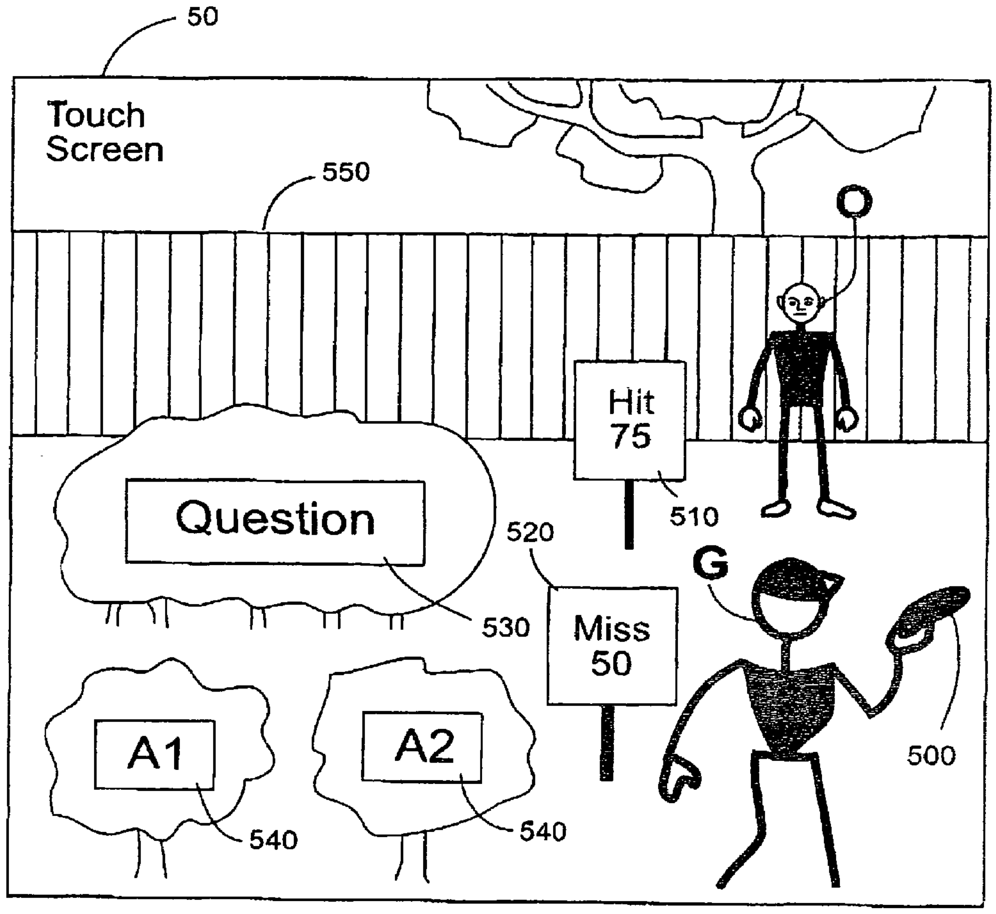
FIG. 5 is an illustration setting forth the second bonus game of the present invention.

Upon aligning bonus trigger symbols B Right to Left on the last three reels R5, R4, and R3, the player enters a bonus screen 50 for play of the second bonus game shown in FIG. 5. On the screen 50, the bonus delivery mechanism will be G throwing a pie 500 at another character O. The opening screen for the second bonus game has the player choose a "victim" character such as from O, J, and A. The player touches the character desired on the touch screen 50. Possible awards 510, 520 for each character chosen are shown in FIG. 5.

In FIG. 6, there is a further award associated with "choosing the victim." Three awards are chosen (one from each row in FIG. 6) and randomly assigned to the three victims. In FIG. 6, the player would have already selected character "O" with awards per line bet for hit/miss randomly drawn from the probability tables shown in FIG. 7. In FIG. 6, there is an award associated with "choosing the victim." If "O" is selected in FIG. 6, the player is randomly awarded 60×, 80× or 100× the line bet. So if the line bet is $0.25 and the random selection for "O" is 80×, the player receives $20. Again, the awards, in one embodiment, are a function of how many bonus trigger symbols B appear on a pay line 60. For example, if four bonus trigger symbols B appear on a pay line 60, the values in FIG. 5 are increased.

The question is shown on the left in a "cloud" 530, character O is located top right, and character G is located bottom right. The two answers A1, A2 are located across the bottom of the screen 50 on bushes 540.

G is shown "weighing" a pie 500 in his hand. When the player touches an answer A1 or A2 on the touch screen 50, this causes G to throw the pie 500 toward character O. If the player is correct, the pie 500 will hit O in the face. If the player is incorrect in selecting the answer to the question, the pie 500 will miss O and splatter against the fence 550. In FIG. 5 are shown two signs 510 and 520 showing the hit or miss awards. In another embodiment only one sign is shown in response to the answer input A1 or A2. In yet another embodiment, the correct answer results in a sign showing that the player is entitled to play the top box award.

If the player succeeds in hitting O with the pie 500, then the player enters the top box bonus game 30. If the player is incorrect in answering the question, the player still receives an award and the second bonus game ends.

In FIG. 7, the Target Practice Pay table is set forth showing a probability P for various combinations of "hit" and "miss." This adds variety and excitement to the second bonus game and it is to be expressly understood that any suitable pay table arrangement of awards could be utilized. FIG. 6 is multiplied by an enhanced factor as the number of bonus trigger symbols B increases but FIG. 7 is not multiplied in the preferred embodiment. The award values in FIG. 7 are multiplied by the initiating line bet and, although not the preferred embodiment, can in some cases also be multiplied by a trigger factor. For FIGS. 3B and 6, the trigger factors are "×1" for three bonus trigger symbols B, "×5" for four bonus trigger symbols B, and "×12" for five bonus trigger symbols B. So a 1-credit per line player with three bonus trigger symbols B would see the award values in FIG. 3B or 5. A 5-credit per line player who got in with four bonus trigger symbols B would get awards (for choosing the victim, e.g., but not the top box bonus) of 25× the 1-credit player with three bonus trigger symbols B.

In summary, a method for operating a bonus game in a casino game machine 10 having a casino base game 20 is set forth above and summarized next. The bonus game is played when a bonus condition occurs in play of the casino base game 20. At the start of the bonus game the player is provided an input choice of displayed characters. A bonus play is provided to the player and the player inputs a character choice. When the player is correct in the bonus play, the displayed chosen character is affected and another bonus game (such as a top box bonus game) is played in response to the affected character. When the player is incorrect in the bonus play, the bonus game ends.

5. Casino Base Game 20:

Any conventional multi-reel, multi- or single-pay line casino base game 20 can be modified to incorporate the above bonus games and the game features discussed next.

a. First Casino Base Game 20 Feature

Figure 8:
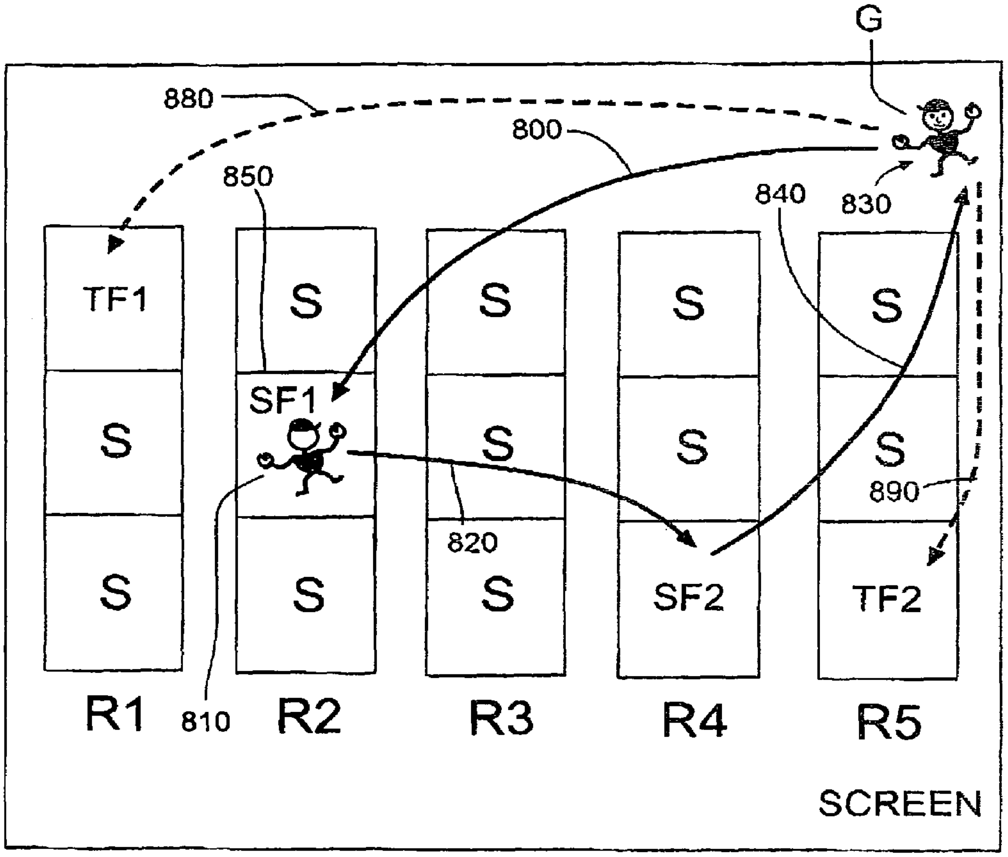
FIG. 8 illustrates a first game feature for the casino base game of the present invention.

Trigger symbols TF appearing on the first and fifth reels R1 and R5 initiate the first casino base game 20 feature as shown in FIG. 8. Any suitable arrangement of trigger symbols TF could be used. In one embodiment, the trigger symbols TF are different, such as a "Bib" symbol TF1 on reel R1 and a "Dinner Bell" symbol TF2 on reel R5. These different graphic symbols, however, are the same "type of trigger" in that together they initiate the first game feature. In one embodiment, no award is given when the trigger symbols TF appear. In another embodiment, a bonus of 3× the total wager is initially awarded when these two trigger symbols TF appear. Thereafter, if changing the trigger symbols TF or any on-screen special feature SF symbol such as a "Sundae" SF1, "Cake" SF2, or "Donuts" symbol to wild creates a higher pay to the player (i.e., better winning combinations in the casino base game 20 due to the presence of wild symbols), then on-screen character G ducks down and hand grabs the "Bib" symbol TF1 from reel R1 (as shown by arrow 880) and the "Dinner Bell" symbol TF2 from reel R5 (as shown by arrow 890). In response, trigger symbols TF1 and TF2 spin (or alternately morph) into wild symbols.

Character G then graphically continues in a displayed video sequence from the right side of the screen 50 and jumps (as shown by arrow 800) to all applicable special feature SF symbols (such as dessert symbols) appearing on the reels R1–R5. Each SF symbol is a "special feature" symbol. Within each special feature SF symbol, character G lands 810 with his back to the player, opens his mouth, and shovels food in with excess splattering on the imaginary screen glass within and adjacent to the symbol square 850. The dessert symbol SF1 also changes (or alternately morphs) to become wild (e.g., a symbol that is a paw print) as character G exits (as shown by arrow 820) and jumps to the next dessert symbol SF2. Character G exits the last dessert symbol SF2 and resumes position 830 on the top right of screen 50 as shown by arrow 840. Character G delicately daubs the corner of his mouth with the retrieved bib, before discarding it. Pays to the player are now determined based on the trigger TF and special feature SF symbols all being wild and awarded.

Upon the reels 40 spinning for the next wager, the symbols S revert back to their normal appearance. In an alternate embodiment, the trigger symbol TF and/or special feature SF symbols on the reel strips 40 retain their "wild" capacity for one or more additional spins. In an alternate embodiment, the newly created "wild" symbols and/or reels 40 on which they appear remain motionless (do not spin) for one or more additional spins. In another alternate embodiment, character G causes the special feature SF symbols landed upon to yield an award and retain their original symbolic nature. In still another alternate embodiment, the special feature SF symbols, character G lands upon take on a random meaning (e.g., award of credits, award of free spins or bonus games, or turning to wild). In another embodiment, the special feature SF symbols landed upon yield awards such as free spins, promotional items, etc.

FIG. 8 in the discussion above illustrates the first base game feature. Any theme, graphic video environment, etc., can be used to implement this feature. Unique trigger symbols TF appear on one or more predetermined reels to initiate this feature during play of a casino base game 20. It is to be expressly understood that any suitable one trigger symbol TF or pattern of trigger symbols TFs appearing on pre-designated reels, symbol positions on reels, or elsewhere could activate a separate graphical item such as character G to become activated and then to act on designated special feature SF symbols (i.e., the dessert symbol in the example above). In one embodiment, the activation of the character G image to impact a particular type of symbol (S) can cause a separate award, cause the symbol to become wild, or cause the symbol to become another symbol, etc. The first base game feature is vigorous in that when a suitable trigger symbol TF occurs, the game feature initiates to cause a separate graphical image to impact on a particular designated special feature SF symbol(s) and to cause that special feature SF symbol to change to another symbol, value, or action to affect the outcome of the casino base game 20.

This casino base game 20 feature can be summarized as providing a novel method of operating the casino game having a predetermined number of reels with symbols. A graphic image is provided in the video display distinct from the reels. The casino game is played in the video display and the predetermined number of reels are spun to a game outcome for at least one pay line. The graphic image becomes animated in the video display to interact with at least one of the symbols in the game outcome. The player is awarded when the graphic image is animated.

b. Second Casino Base Game 20 Feature

Figure 9:
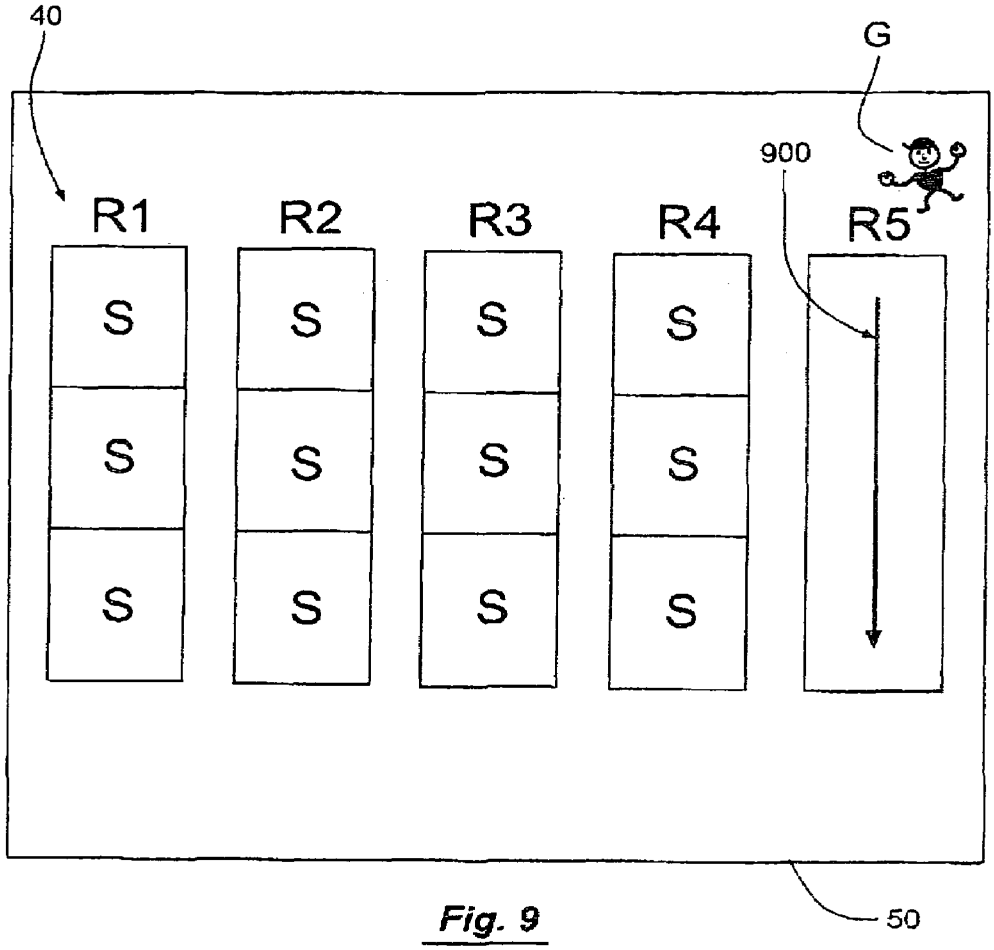
FIG. 9 illustrates a second game feature for the casino base game of the present invention.

The second base game feature of the present invention causes the fifth reel R5 to get "stuck" 900 by continuing to spin and not stopping when reels R1 to R4 stop as shown in FIG. 9. Character G raises a fist and pounds it down on the fifth reel R5 to stop it. A bonus is awarded to the player in response to this pounding action in addition to any other awards in play of the casino base game 20. Thereafter, standard pays are awarded.

In FIG. 10, the probability P for the award (in response to the pounding action) is set forth. As noted in FIG. 10, the player sees an average award of 5× the total bet in credits (units) with a probability of receiving awards of various values as shown. Clearly, any suitable pay table could be utilized to implement this casino base game 20 feature.

In FIG. 12, in another embodiment, the pay table for implementing this feature is set forth. This is an example only and any suitable pay table could be utilized. Again, the probability P is shown with an award in units or credits having an average award to the player of 5× the total bet in credits (units). Also, in other embodiments two or more reels may not stop, e.g., for even a higher award than if only one reel doesn't stop.

Figure 14:
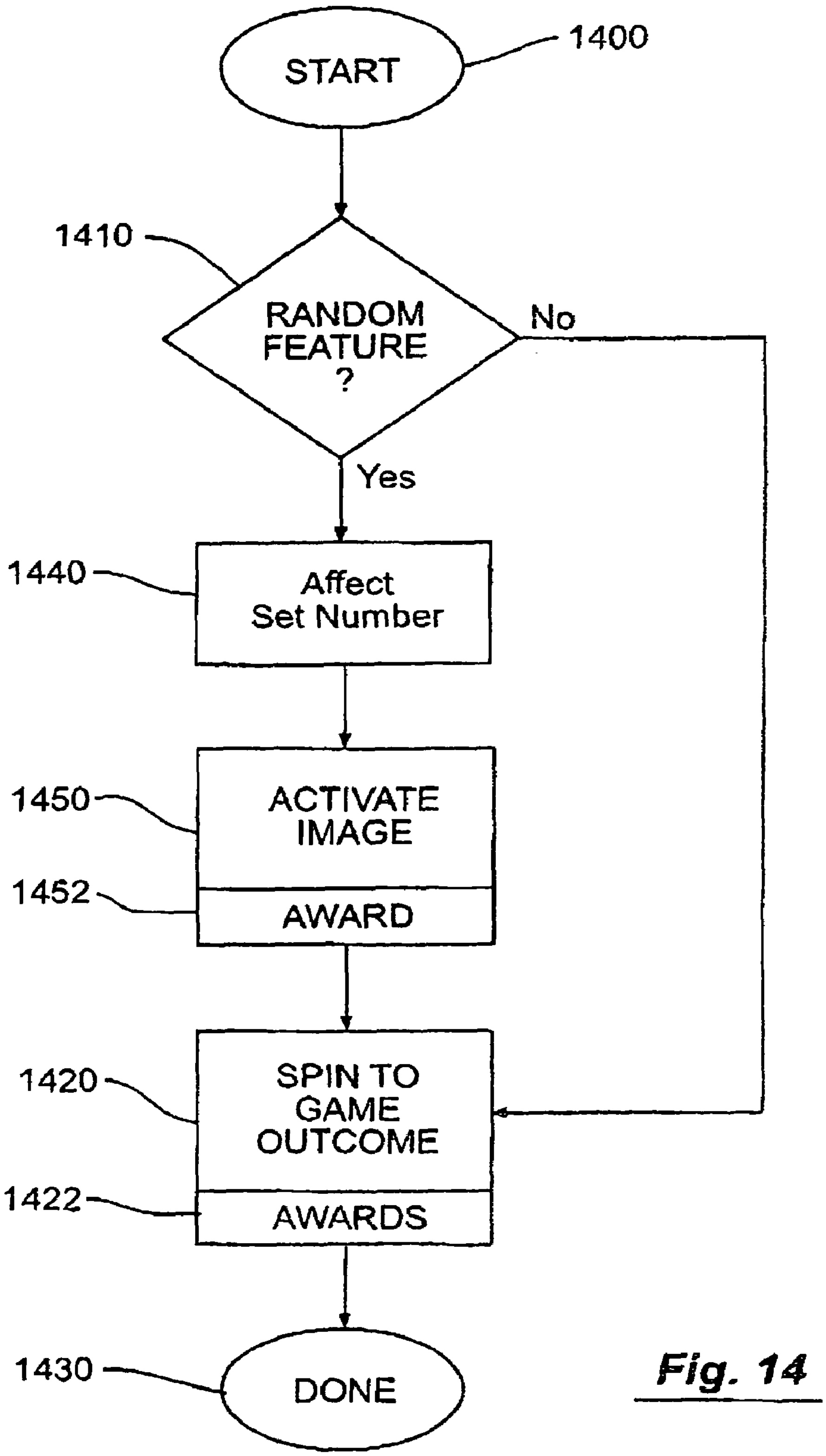
FIG. 14 sets forth the method steps for implementing the game feature of FIG. 9.

In FIG. 14, the method for implementing the second base game feature in the computer 100 is shown. This method is implemented in the casino game machine 10 or simply in a casino game having a predetermined number of reels 40. The game is conventionally started in response to a wager in stage 1400. The second base game feature randomly occurs based on conventional random generating techniques for casino games. The casino game machine 10 determines in stage 1410 whether this game that is being wagered on will have the random feature. If not, stage 1420 is entered and the game normally spins to a conventional game outcome without implementing the feature of the present invention and the game is over with in stage 1430. Any awards 1422 won are given.

However, if the random feature randomly occurs so as to be implemented then stage 1440 is entered. A set number of the reels 40 are affected based on the random activation. In the above example, the set number is one and it is the fifth reel R5 that is affected. The effect is to continue spinning the fifth reel R5 after the other reels 40 have stopped spinning. Hence, in the above example, one reel 40 is affected and the effect is to continue spinning. The invention is vigorous in that any number of reels 40 could be chosen to be the set number other than one with other effects as discussed above. Too, in one embodiment, when the reel 40 is "bumped" by character G and stopped, the symbols S appearing on the reel 40 become wild automatically. In this way, the player is "awarded" 1452 for the "technical difficulties" the machine experienced. In stage 1450 the character G image is activated, an award 1452 is given, and the affected reel 40 is acted upon to behave normally and to spin to a game outcome in stage 1420 with all symbols S becoming wild. Awards 1422 won are given. In a variation, the player is given an award when the character G is activated to stop the spinning reel. In this variation, the reel stops with conventional random symbols.

The above second casino base game 20 feature provides a method of operating a casino game having a predetermined number of reels 40. Here, a graphic image is provided in a video display. The award feature for the casino game is randomly activated and the casino game is played in a video display. The predetermined number of reels 40 are spun so as to stop with a game outcome for at least one pay line. The spinning of a set number of predetermined number of reels 40 continues until the animated graphic image visually causes the affected set number of reels 40 to spin to the game outcome.

c. Third Casino Base Game Feature

Figure 11:
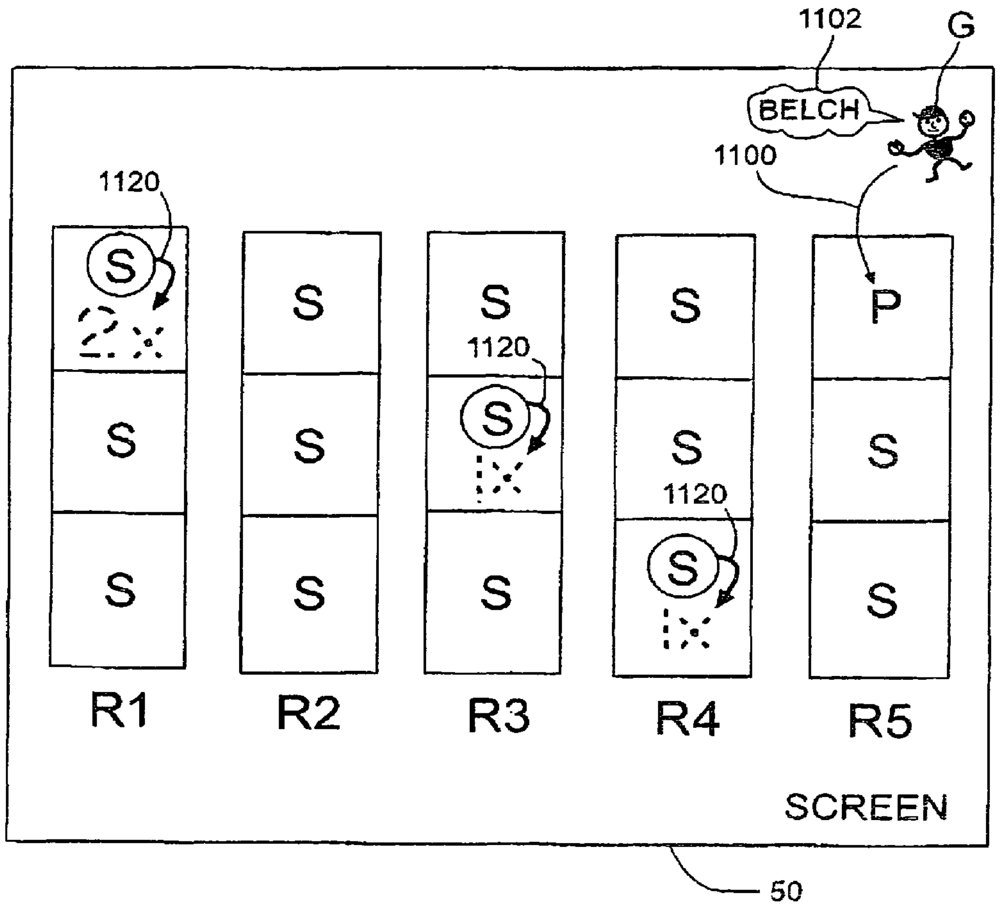
FIG. 11 illustrates a third game feature for the casino base game of the present invention.

A popcorn symbol P appearing in the fifth reel R5 top position 1100 causes character G to reach down 1110, sneak a few pieces of popcorn, and toss them into his mouth as shown in FIG. 11. At this point, character G may or may not belch 1102. With a random probability of 0.62, character G does not belch, and an award of 2× the total bet is given to the player in response. With a random probability of 0.38, character G lets loose a belch. As character G belches 1102, between three and eight of the symbols S on the reels 40 "roll-up" (i.e., such as a window shade being pulled and rapidly moving upward to roll around the roll-up mechanism) 1120 revealing a total bet multiplier beneath each removed symbol (one of which is always 2×, the remainder of which are each randomly assigned awards of either 1× and 2× the total wager based on a weighted pay table). These are shown in dotted lines, as an illustration, in FIG. 11 as 2×, 1×, and 1×. The feature award is accumulated (i.e., in FIG. 11: 2×+1×+1×=4×), then the symbols S are replaced to their normal appearance prior to counting normal pays. The present invention can use any character to interact with one symbol P to produce a result on the same symbol P or on other symbols S.

Figure 15:
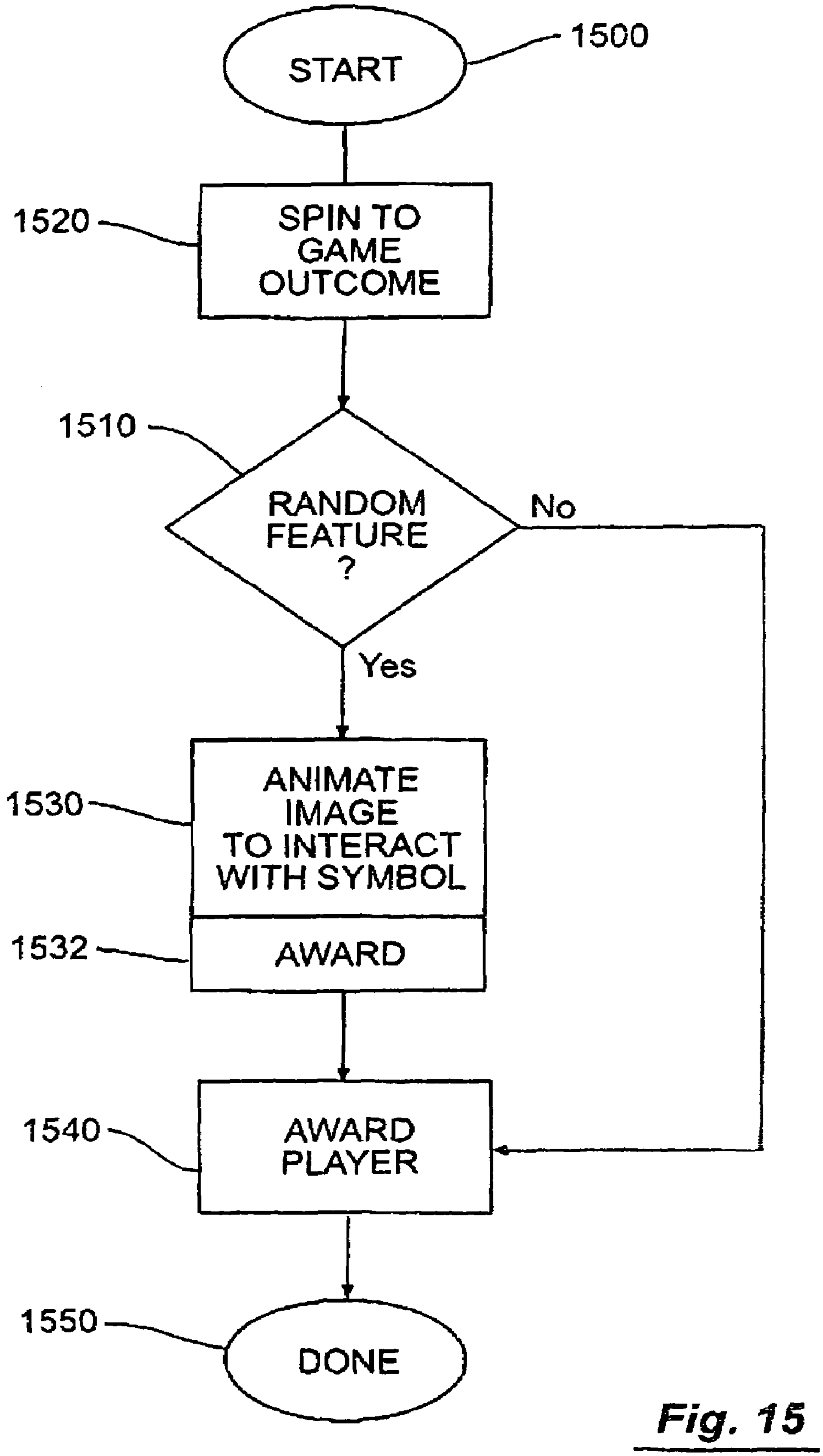
FIG. 15 sets forth the method steps for implementing the game feature of FIG. 11.

In FIG. 15, the present invention has a method implemented into the casino game machine 10 or into any casino game having reels 40 such as a slot machine. The method starts 1500 when a player makes a conventional wager to play the casino game. The casino game spins the reels 40 in stage 1520 to a game outcome. Stage 1520 determines whether the random feature of the present invention has been initiated. If no random feature occurs, the game outcome conventionally provides awards in stage 1540. However, if the random feature in stage 1510 occurs, then stage 1530 is entered. In response to the activation of the random feature, the character G image animates and interacts with a symbol such as symbol P (for example, taking a bite of popcorn). At this time stage 1532 awards the player. There may be even further awards such as other symbols S, as shown in FIG. 11, turning (in multiples or even wild symbols) and resulting in further awards 1532.

While several features and multiple bonuses have been disclosed, those skilled in the art will appreciate that the outcome of a game may indicate more than one feature, more than one bonus, or a combination of feature(s) and bonus(es) may occur. In this case, the preferred embodiment first treats the casino base game 20 features sequentially, and then treats the bonus games sequentially. If desired, a "running" credit meter may advise the player, throughout the sequential features and/or bonuses, of their cumulative award.

This casino base game 20 feature can be summarized as providing a novel method of operating the casino game having a predetermined number of reels 40 with symbols S. A graphic image G is provided in the video display 50 distinct from the reels 40. The casino game is played in the video display 50, and the predetermined number of reels 40 are spun to a game outcome for at least one pay line. The graphic image G becomes animated in the video display 50 to interact with at least one of the symbols S in the game outcome. The player is awarded when the graphic image G is animated.

6. Spin Bonus (Top Box):

A number of awards such as ten awards are depicted in top box bonus 30 wheel assembly 200. Each award is located in a segment 202 together with a character G as shown in FIG. 1.

The award is selected, in one embodiment, in a clockwise spin sequential illumination 210 of a lighted segment 230 slowing to a value. Again, multipliers times the line bet are used as the values.

Figure 13:
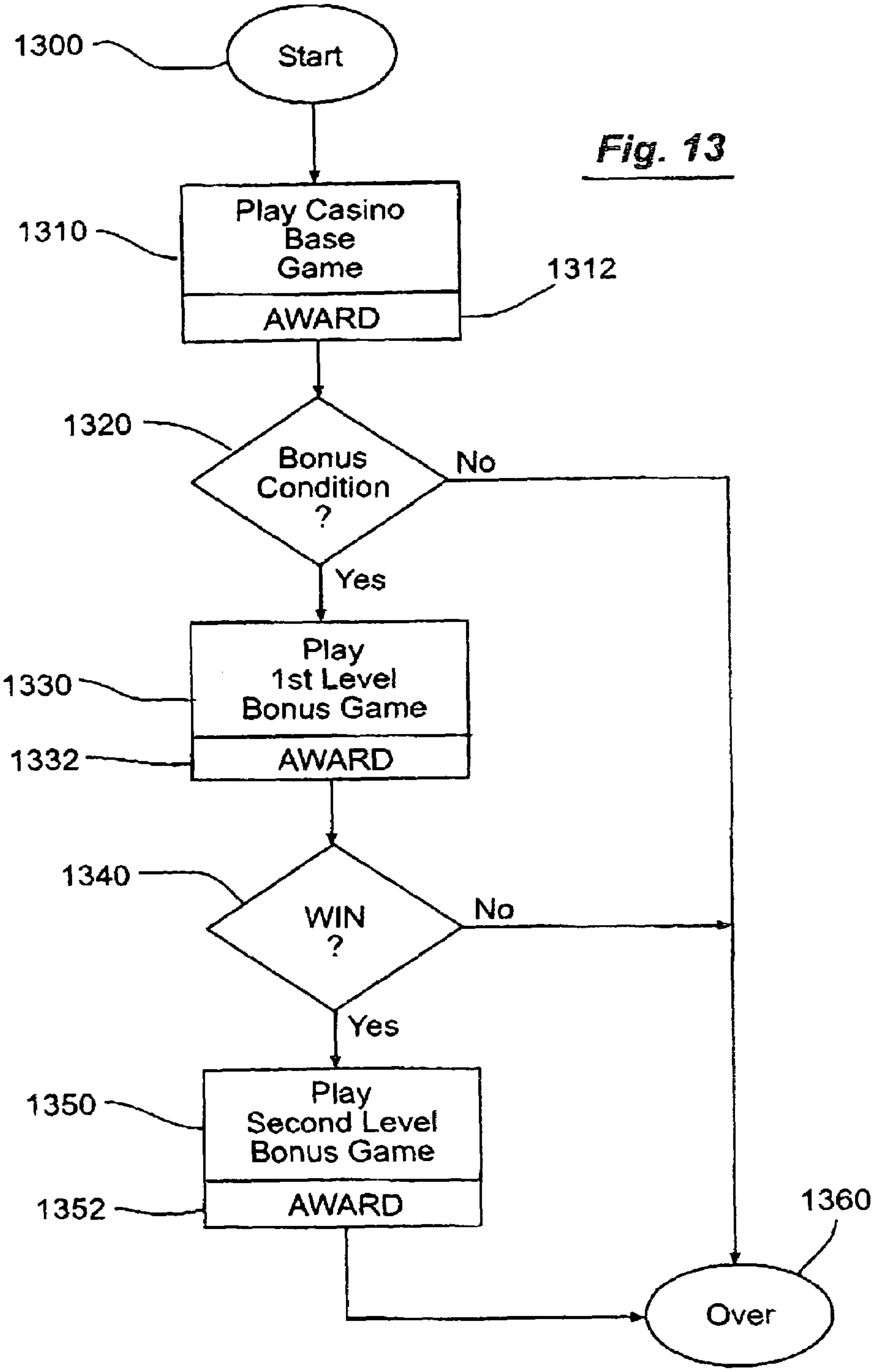
FIG. 13 sets forth a flow chart showing the method steps for implementing the top box bonus game of the present invention.

In FIG. 13, the present invention is set forth as a series of method steps. In step 1300 the player commences play of the casino game machine 10 by placing a wager. The casino base game 20 is played in step 1310 to an outcome that may include awards 1312. During play 1310 of the casino base game 20, a bonus condition may arise (for example, the bonus symbol B triggers as discussed earlier or any other suitable bonus condition). If no bonus condition arises in play of the casino base game 20 stage 1320, then the game is over at stage 1360. However, if a bonus game condition occurs in stage 1320, then stage 1330 is entered and the player plays the first level bonus game and receives any awards 1332. If the player wins in the first level bonus game (for example, obtaining a hit in FIG. 5 or reaching the refrigerator 310 in FIG. 3), then the second level bonus game (e.g., top box bonus) is played in stage 1350. Again, any awards 1352 are made and once played the game is over in stage 1360. If the player doesn't win in the first level bonus game in stage 1330, then in stage 1340 the game is over in stage 1360.

7. Scratch Lottery/Pull Tab Embodiment

Figures 16, 17:
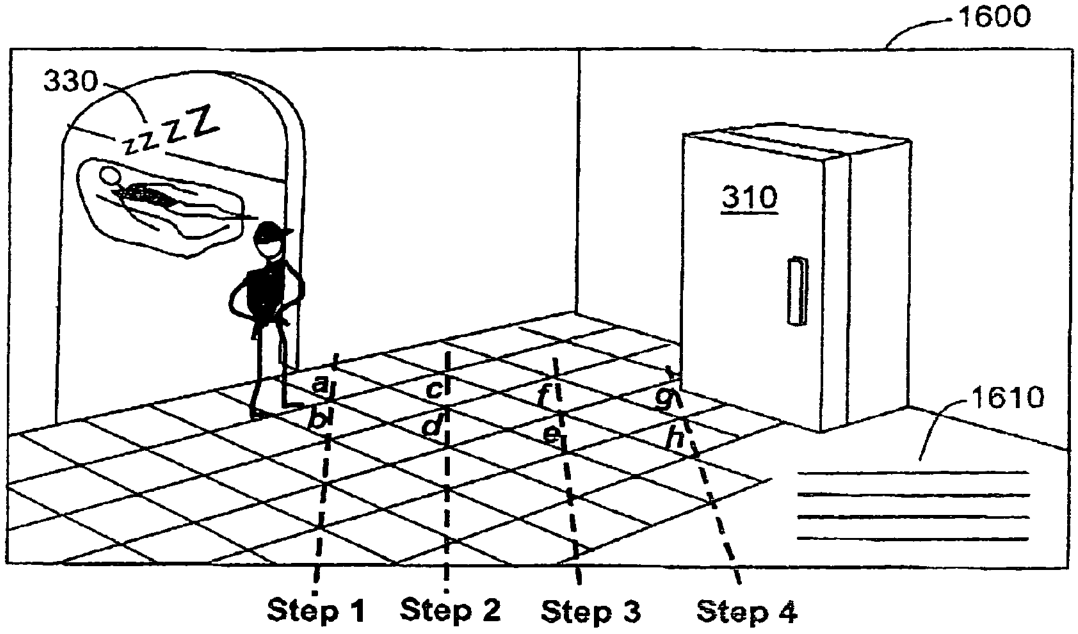
FIG. 16 illustrates a scratch ticket of the present invention based on FIG. 3A.
FIG. 17 sets forth a table of play possibilities for the ticket of FIG. 16.

The present invention can be adapted to a game ticket environment such as a scratch lottery ticket or pull tab rather than for play on a touch screen 50. With respect to FIG. 3*a*, rather than a touch screen 50 the game is presented on a printed ticket with a scratch off covering (removable media or removable material). An example of such a ticket 1600 is shown in FIG. 16. The ticket 1600 would have a set of instructions 1610 that could, for example, state: "Please scratch only one of the two tiles at each step. If you make it to the refrigerator scratch the door off the refrigerator to win your prize. When you uncover a "minus Z," scratch off one of the Z's on the sleeping character. If you scratch off all of the Z's before reaching the refrigerator you lose. Scratching off more than one tile at a step invalidates the ticket."

It is to be expressly understood that any type of media or material may be used over the play areas that may be selectively removed by a player to reveal information to the player. The information could be an instruction, an award, or other information.

A play example is shown in FIG. 17 wherein beneath each tile at each step are hidden play instructions. For example, in FIG. 17 at step 1, should the player scratch off tile a, a "minus Z" occurs and the player would scratch off one of the four Z's 330. This process continues at each step until, in this example, the player makes it to tile h in step 4 to open the refrigerator door 310. It can be seen in the example of FIG. 17, that if the player steps on a, c, and f the game is over. If the player steps on a, c, e, and g the game is over. If the player steps on b, c, f, and g, the game is over. However, if the player steps on a, d, e, and h, or if the player steps on a, c, e, and h, he can open the door 310. Obviously a number of other combinations exist, but this illustrates the teachings of the present invention. The use of word "step" refers to "scratching off" the step selected by the player.

Figures 18, 19:
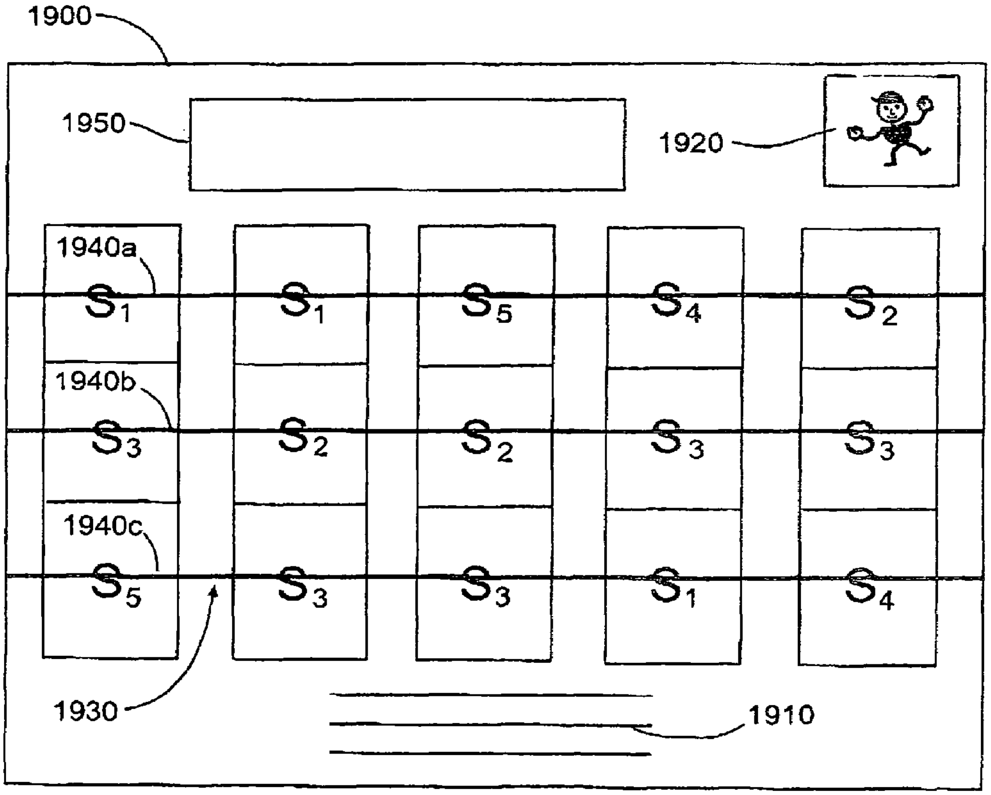
FIG. 18 sets forth a second table of play possibilities for the ticket of FIG. 16.
FIG. 19 illustrates a scratch ticket of the present invention based on FIG. 8.

In another example shown in FIG. 18, the result can be deterministic so it doesn't matter if the player scratches off all of the steps on all of the Z's, the end result would be a loss. In other words stepping on steps 1, 2, and 3 would ensure a loss no matter the sequence. In a similar fashion, "next step" instructions could be added to ensure a deterministic win. In FIGS. 17 and 18, symbols for a party horn, a harp, etc., could be utilized with the minus Z indications contained therewithin.

With respect to FIG. 19 which corresponds to FIG. 8, a player would purchase a ticket 1900 and follow a set of instructions 1910 that could, for example, state: "Scratch off area 1920 containing a character G. Under character G is a symbol. For the reel symbols presented 1930, scratch off only the corresponding symbols to reveal a wild symbol. Then compare the combinations on pay lines 1940*a*, 1940*b*, 1940*c* to the pay table 1950 to receive cash prizes for any winning combinations." Hence, the player after paying money for the ticket 1900 would scratch off area 1920 to reveal, for example, symbol $S_2$. The player would then scratch off the three appearances of symbol $S_2$ in the game play area 1930 to reveal wild symbols. Assume the pay table 1950 has a cash payout for five $S_3$s on a pay line, which in this example occur on pay line 1940*b* when symbols $S_2$ are scratched off to reveal wild symbols that when combined with the three remaining symbols $S_3$ provides a winning combination. In this case, the player can scratch off the entire protective covering on card 1900 and the results would still be the same since under other symbol areas scratching off symbol $S_1$ would reveal that symbol, etc. Hence each card is completely deterministic.

In another embodiment, the player scratches the character 1920 to reveal a symbol such as symbol $S_2$. Again the player scratches all symbols in the game outcome matrix to reveal cash awards. The result is deterministic.

The above disclosure sets forth a number of embodiments of the present invention described in detail with respect to the accompanying drawings. Those skilled in this art will appreciate that various changes, modifications, other structural arrangements, and other embodiments could be practiced under the teachings of the present invention without departing from the scope of this invention as set forth in the following claims.

I claim:

1. A method for operating two bonus games in a casino game machine having a multi-reel, multi-pay line casino base game, said method comprising:

providing a set of bonus symbols in the multi-reel, multi-pay line casino base game, playing a first bonus game when a first predetermined orientation of bonus symbols in the set occur on a wagered pay line during play outcome in the multi-reel, multi-pay line casino base game;

playing a second bonus game when a second predetermined orientation of bonus symbols in the set occur on a wagered pay line during play outcome in the multi-reel, multi-pay line casino base game;

the playing of the first and second bonus games occurring under control of the multi-reel, multi-pay line casino game machine;

awarding awards based on play outcome for the first and second bonus games.

2. The method of claim 1 wherein playing the first bonus game occurs when the first predetermined orientation of bonus symbols in the set occurs on the wagered pay line of the multi-reel, multi-pay line casino base game on reels from left to right.

3. The method of claim 1 wherein playing the second bonus game occurs when the second predetermined orientation of bonus symbols in the set occurs on the wagered pay line of the multi-reel, multi-pay line casino base game on reels from right to left.

4. The method of claim 1 wherein the first bonus game is played in succession with another first bonus game when the first predetermined orientation of bonus symbols in the set occurs in another wagered pay line in the play outcome of the multi-reel, multi-pay line casino base game.

5. The method of claim 1 wherein all first bonus games are played as one bonus game with the awards adjusted to increase when the first predetermined orientation of bonus symbols in the set occur on more than one wagered pay line in the play outcome of the multi-reel, multi-pay line casino base game.

6. The method of claim 5 wherein each first predetermined orientation of bonus symbols in the set occurring on a wagered pay line in the play outcome causes the award to increase by a multiple value based on the number of wagered pay lines the first predetermined orientation of bonus symbols occurs in.

7. The method of claim 1 wherein the second bonus game is played in succession with another second bonus game when the second predetermined orientation of bonus symbols in the set occurs in another wagered pay line in the play of the multi-reel, multi-pay line casino base game.

8. The method of claim 1 wherein all second bonus games are played as one bonus game with the awards adjusted to increase when the second predetermined orientation of bonus symbols in the set occurs on more than one wagered pay line in the play outcome of the multi-reel, multi-pay line casino base game.

9. The method of claim 8 wherein each second predetermined orientation of bonus symbols in the set occurring in the play outcome causes the award to increase by a multiple value based on the number of wagered pay lines the second predetermined orientation of bonus symbols occurs in.

10. The method of claim 1 wherein the bonus symbols are all alike.

11. The method of claim 1 wherein the first bonus game comprises:

providing a meter;

providing a path to a goal, the path having a number of stopping points;

providing an input choice to a player at each stopping point;

adjusting the meter when the player inputs a choice that changes a value in the meter;

allowing the player to advance from stopping point to stopping point along the path to the goal until (1) the meter reaches a predetermined value that ends the bonus game or (2) until the goal is reached.

12. A method for operating two bonus games in a casino game machine having a multi-reel, multi-pay line casino base game, said method comprising:

providing a set of bonus symbols in the multi-reel, multi-pay line casino base game, playing a first bonus game when a first predetermined orientation of bonus symbols in the set occur on a wagered pay line during play outcome in the multi-reel, multi-pay line casino base game; wherein said first bonus game further comprises:

a) displaying a meter on a display in the first bonus game;

b) displaying a path to a goal on the display, the path having a number of stopping points;

c) providing an input choice to a player at each stopping point;

d) adjusting the meter when the player inputs a choice that changes a value in the meter;

e) allowing the player to advance from stopping point to stopping point along the path to the goal until the meter reaches a predetermined value that ends the bonus game or until the goal is reached;

playing a second bonus game when a second predetermined orientation of bonus symbols in the set occur on a wagered pay line during play outcome in the multi-reel, multi-pay line casino base game;

the playing of the first and second bonus games occurring under control of the multi-reel, multi-pay line casino game machine;

awarding awards based on play outcome for the first and second bonus games.

13. The method of claim 12 wherein playing the first bonus game occurs when the first predetermined orientation of bonus symbols in the set occurs on the wagered pay line of the multi-reel, multi-pay line casino base game on reels from left to right.

14. The method of claim 12 wherein playing the second bonus game occurs when the second predetermined orientation of bonus symbols in the set occurs on the wagered pay line of the multi-reel, multi-pay line casino base game on reels from right to left.

15. The method of claim 12 wherein the first bonus game is played in succession with another first bonus game when the first predetermined orientation of bonus symbols in the set occurs in another wagered pay line in the play outcome of the multi-reel, multi-pay line casino base game.

16. The method of claim 12 wherein all first bonus games are played as one bonus game with the awards adjusted to increase when the first predetermined orientation of bonus symbols in the set occur on more than one wagered pay line in the play outcome of the multi-reel, multi-pay line casino base game.

17. The method of claim 16 wherein each first predetermined orientation of bonus symbols in the set occurring on a wagered pay line in the play outcome causes the award to increase by a multiple value based on the number of wagered pay lines the first predetermined orientation of bonus symbols occurs in.

18. The method of claim 12 wherein the second bonus game is played in succession with another second bonus game when the second predetermined orientation of bonus symbols in the set occurs in another wagered pay line in the play of the multi-reel, multi-pay line casino base game.

19. The method of claim 12 wherein all second bonus games are played as one bonus game with the awards adjusted to increase when the second predetermined orientation of bonus symbols in the set occurs on more than one wagered pay line in the play outcome of the multi-reel, multi-pay line casino base game.

20. The method of claim 19 wherein each second predetermined orientation of bonus symbols in the set occurring in the play outcome causes the award to increase by a multiple value based on the number of wagered pay lines the second predetermined orientation of bonus symbols occurs in.

21. The method of claim 12 wherein the bonus symbols are all alike.

* * * * *